UNITED STATES PATENT OFFICE.

FERDINAND EPHRAIM, OF SAN FRANCISCO, CALIFORNIA.

VULCANIZED MATERIAL AND PROCESS FOR MAKING THE SAME.

No. 819,529.     Specification of Letters Patent.     Patented May 1, 1906.

Application filed July 11, 1905. Serial No. 269,246.

*To all whom it may concern:*

Be it known that I, FERDINAND EPHRAIM, a citizen of the United States, and a resident of San Francisco, in the county of San Francisco and State of California, have invented certain new and useful Improvements in Vulcanized Material and Processes for Making the Same, of which the following is a full, clear, and exact description.

My invention relates to the manufacture of rubber, and more particularly to the utilization of certain comminuted portions of the vegetable fiber contained in the natural rubber when ready for manufacture.

By way of explanation it may be stated that ordinarily in the manufacture of rubber goods from raw material the crude rubber is first subjected to a cleansing process for the purpose of removing impurities contained in it, these impurities consisting largely of pulverized or comminuted vegetable fiber. After the removal of the impurities mentioned the rubber is next admixed with more or less comminuted pulverized or vegetable matter—such, for instance, as cotton fiber—for the purpose of adding firmness to the rubber, or rather to the articles into which it is to be made. For instance, in the manufacture of rubber floor-mats, bumpers, tiles, and many molded, pressed, and formed rubber articles the material commonly employed consists of pure rubber and its compounds made by vulcanizing or curing, and to these are added fibrous or vegetable ingredients in a pulverized or comminuted state. Cotton waste is ordinarily employed for this purpose.

As above stated, my invention relates to the utilization of crushed or pulverized material naturally found in caoutchouc, rubber, or gum containing plants. This pulverized material in its natural state contains what I have found to be an excellent substitute for the fibrous vegetable material commonly added in the manufacture of the rubber goods. In other words, I have discovered that instead of removing as an impurity the fibrous material already found in the crude rubber and adding the material made of the cotton waste it is much better to work up the crude rubber without subjecting it to the special processes employed for removing the fiber.

The fibers contained within the pulverized rubber material of rubber-containing plants are by nature associated with the rubber and are by natural consequences adhesive to each other, which is not the case with regard to the fibers ordinarily used. This may be due partly to the fact that in the pulverized rubber material the physical connection between the fibers and the rubber is more complete. At any rate the assimilation between the rubber and the fiber already contained in it is more perfect than that attained by adding cotton waste to the rubber. In Mexico and elsewhere there are plants which produce so-called "crude rubber" in which eighteen to twenty per cent. is pure rubber, the residuum being the fiber of the plant.

Mechanical rubber goods manufactured from pulverized materials of rubber-containing plants are firmer and of superior durability. The removal or the separation of the vegetable fibers found in crude rubber has thereofore been quite expensive, and when the fiber is thus removed it is of no value and merely forms a waste product. My invention, therefore, accomplishes two purposes, to wit: It utilizes the fiber already contained within the rubber, thus saving the expense of removing it and substituting something else, and it makes a better quality of rubber, due to the better coherence of the mass as a whole. This effects a considerable saving in the cost of the manufacture of rubber goods.

Having thus described my invention, I claim as new and desire to secure by Letters Patent—

1. The process herein described of treating rubber or gum containing plants, which consists in crushing or pulverizing the same as a whole, adding thereto a vulcanizing material, and then vulcanizing the admixture.

2. The product herein described, consisting of vulcanized material containing crushed, ground or pulverized material in the proportions found in rubber or gum containing plants.

3. The process herein described of treating rubber or gum containing plants, which consists in crushing or pulverizing the same, so as to form a powder consisting partly of rubber or analogous material admixed with the natural fiber of the plant, adding a vulcanizing material, and finally vulcanizing the admixture.

In testimony whereof I have signed my name to this specification in the presence of two subscribing witnesses.

FERDINAND EPHRAIM.

Witnesses:
     A. LAMADRID,
     JULIO ERPEJO.